J. ERICKSON.
TELEPHONE METER SERVICE SYSTEM.
APPLICATION FILED FEB. 21, 1916.
1,286,966.
Patented Dec. 10, 1918.
3 SHEETS—SHEET 2.
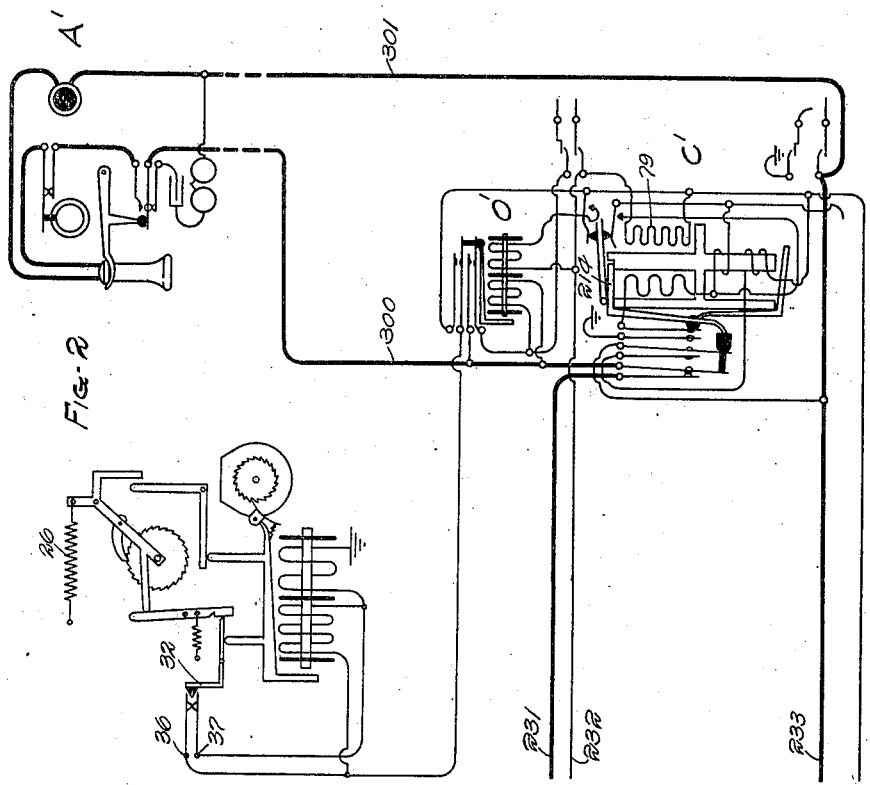
WITNESSES
INVENTOR
JOHN ERICKSON
By Charles C. Bulkley
ATTORNEY

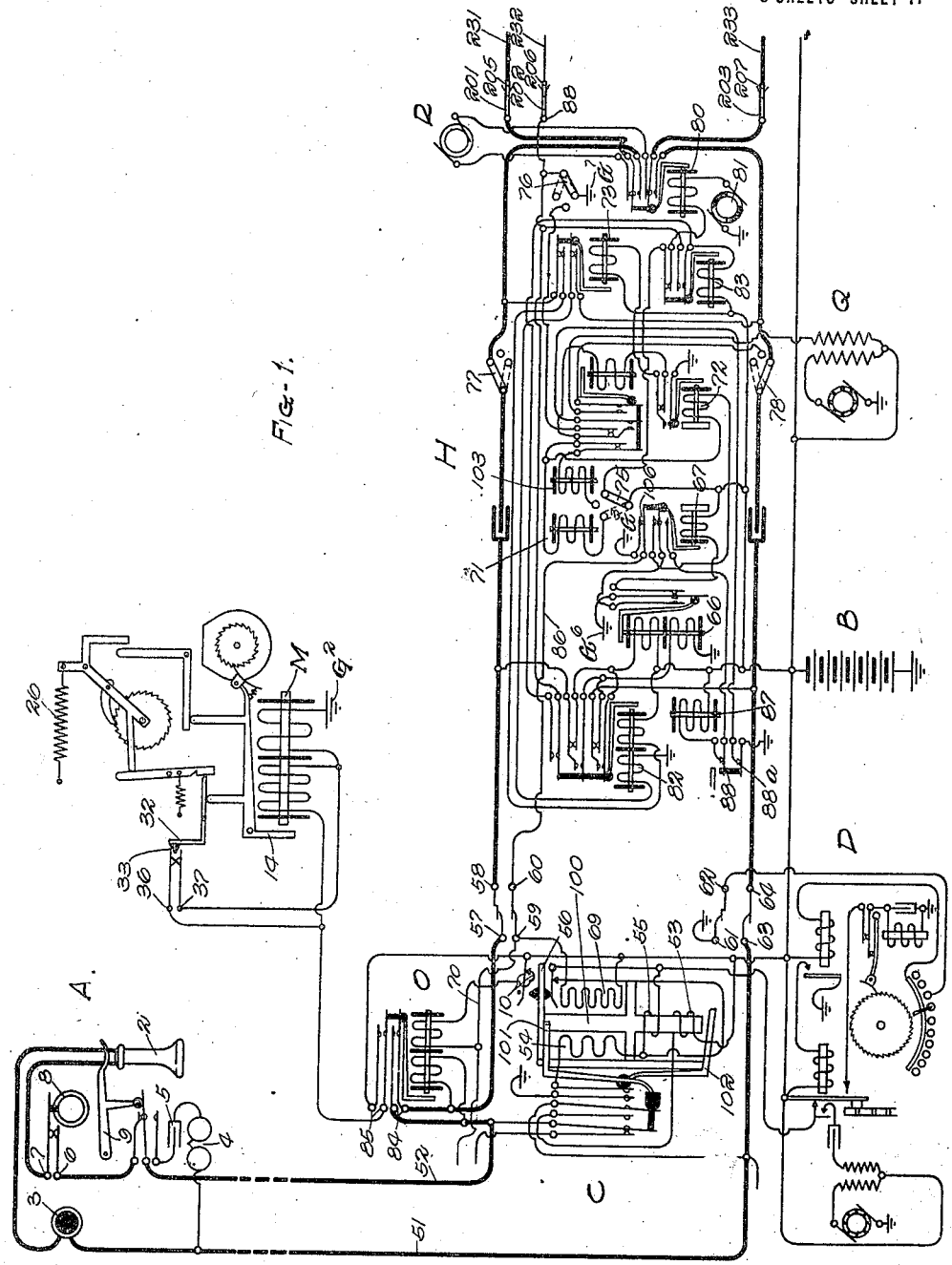

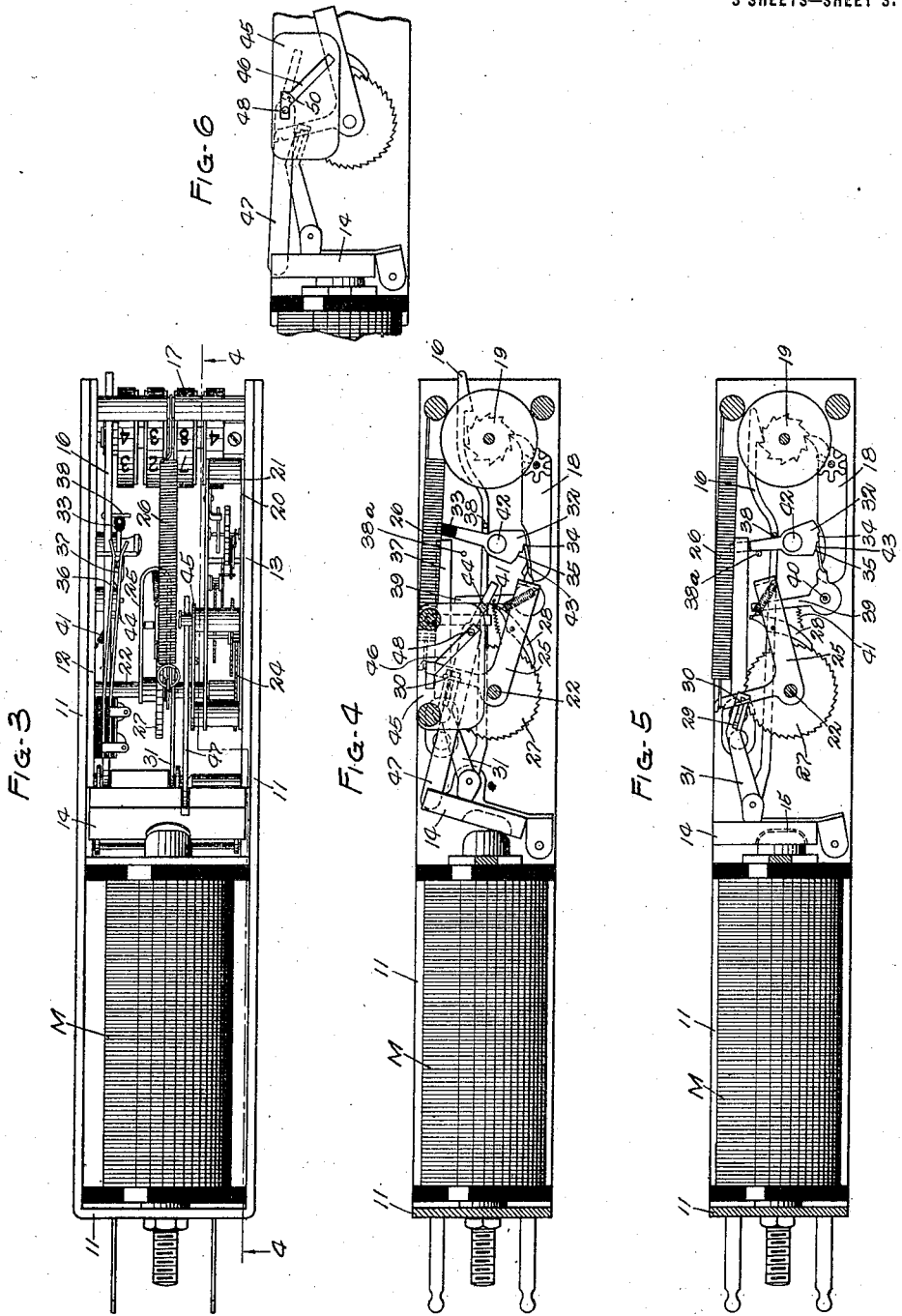

UNITED STATES PATENT OFFICE.

JOHN ERICKSON, OF CHICAGO, ILLINOIS, ASSIGNOR TO AUTOMATIC ELECTRIC COMPANY, OF CHICAGO, ILLINOIS, A CORPORATION OF ILLINOIS.

TELEPHONE-METER-SERVICE SYSTEM.

1,286,966.     Specification of Letters Patent.     Patented Dec. 10, 1918.

Application filed February 21, 1916. Serial No. 79,673.

*To all whom it may concern:*

Be it known that I, JOHN ERICKSON, a citizen of the United States of America, and a resident of Chicago, county of Cook, and State of Illinois, have invented certain new and useful Improvements in Telephone-Meter-Service Systems, of which the following is a specification.

My invention relates in general to telephone meter service systems, but has more particular reference to those meter systems in which the operation of a subscriber's metering device is made to depend in some manner upon the actual length of conversations rather than upon the number of separate conversations.

Meter systems in which the charges are based upon a certain length of conversation are very desirable for they secure a much more equitable distribution of tariffs among the subscribers than do those systems in which a single rate is charged for each call irrespective of the time consumed.

The principal object of my invention is to provide a subscriber's meter adapted for actuation upon the response of a called subscriber and which is provided with a time mechanism whose function it is to produce additional actuations of the meter at regular intervals during those conversations which last longer than a certain predetermined limit. This limit may be made anything desired within reasonable bounds. If fixed at two minutes, a subscriber will be able to talk for two minutes without having his meter register more than one call against him, but should the conversation continue beyond the two minute limit, the meter is automatically operated to register another call.

Further objects of my invention relate to mechanical details by which I am able to combine a subscriber's meter with a time mechanism in such manner as to produce a compact and efficient mechanism of the character described.

To accomplish the foregoing and other useful ends, I employ means which will be hereinafter set forth and explained, reference being had to the accompanying drawings, in which Figures 1 and 2 represent diagrammatically a complete circuit connection between a calling substation A and a called substation A' in a system embodying the principles of my invention; while Figs. 3, 4, 5, and 6 show the preferred mechanical construction of the subscriber's meter.

Referring now to Fig. 1, the substation A may be of any suitable or well known type as, for example, the type disclosed in British patent to T. G. Martin, No. 1419 of 1910, and as represented herein, comprises the receiver 2, transmitter 3, switch hook 9, ringer 4, and condenser 5. Being an automatic substation, there is also provided a pair of impulse springs 6 and 7 and an impulse wheel 8, which latter is assumed to be controlled through the medium of a finger hole dial (not shown).

Allotted to the line conductors 51 and 52 at the central exchange is an individual or line switch C, which may be of the general type of line switch shown in British patent to James, No. 26,301, of 1906; being, however, more nearly of the particular type disclosed in British patent to Martin, No. 1298 of 1910.

Among other details, the line switch C comprises a plunger (not shown) attached to the end of a so called plunger arm 56 which is controlled by the magnet 100. The magnet 100 has four windings, a pull-in winding 54, a cut-off winding 69, a line winding 53, and an auxiliary winding 55. The core of magnet 100 is so constructed that the magnetic circuit of windings 53 and 55 is independent of the magnetic circuit of windings 54 and 69. The winding 54 operates both the plunger arm 56 and the cut-off armature 101 while the winding 69 is only strong enough to operate the armature 101 and to hold the plunger arm 56 in an operated position after it has been operated by the pull-in winding. The circuit of the pull-in winding is controlled by the armature 102, operated by the line winding 53 in conjunction with the auxiliary winding 55. When the plunger arm 56 is operated the plunger is forced into a bank of springs, forcing the springs 57, 59, 61, and 63 into engagement, respectively, with contacts 58, 60, 62, and 64. Although only one set of springs and contacts 57—64 is shown, it is to be understood that each line switch is provided with a plurality of such sets, each set forming the terminal of a trunk line leading to a connector switch similar to the connector switch H. Each trunk line is connected in multiple to the corresponding springs of all the line switches of the group which is controlled by the master switch D.

The master switch D is of the same general type as that disclosed in British patent to James No. 26,301 of 1906, above referred to; being, however, more nearly of the particular type disclosed in British patent to Martin, No. 1419 of 1910. The function of the master switch, as is well known, is to maintain the plungers of all the idle line switches in position before the contact terminals of an idle trunk line.

The connector switch H may be of the general type of connector switch disclosed in United States Letters Patent No. 815,176, granted March 13, 1906, to Keith, Erickson, and Erickson; being, more nearly of the particular type disclosed in British patent to the Automatic Telephone Mfg. Co., No. 2270 of 1914. Among other details, the connector H comprises a bank of contacts arranged in horizontal rows or levels, which contacts are adapted to be engaged by a set of wipers 201, 202, and 203 carried upon a shaft (not shown) which has a vertical movement controlled by the vertical magnet 71 and a rotary movement controlled by the rotary magnet 103. The various parts of the switch are controlled through the medium of the double wound line relay 66. The usual side switch wipers 75, 76, 77, and 78 are controlled by the private magnet 73 in the regular manner. Means for permitting the switch to be restored to normal position is provided in the release magnet 87 which, upon energizing, withdraws the retaining pawls from the shaft and restores the side switch wipers to their first position. Springs 88 and 88ª are controlled by the shaft and make contact with their respective contact points only when the said shaft has been raised one or more steps from its normal position. Relays 67 and 72 are slow acting, that is, they are slow to retract their armatures when their respective energizing circuits are broken. Various other relays not now specifically mentioned will be referred to in the detailed description of the operation.

While, for the purpose of simplifying the the drawings, I have shown the line switch C as having direct access to the connector H, it will be understood by those versed in the art that selector switches may be interposed between the line switches and the connector switches for the purpose of increasing the capacity of the system. Selector switches which may be used for this purpose are of the type shown in the British patent to the Automatic Telephone Mfg. Co., No. 2543 of 1914.

Referring now to Fig. 2, the substation A' and its associated line switch C' may be in all respects similar to substation A and line switch C, already described.

Referring now to Figs. 3, 4, 5, and 6, Fig. 3 is a top view of my time registering device, Fig. 4 is a sectional view taken along line 4—4 of Fig. 3, Fig. 5 is a view similar to view 4 except that certain mechanical parts have been omitted to more clearly show the construction of the said meter, and Fig. 6 is a detail of certain of the mechanical parts shown in Fig. 4. A flat strip of metal is formed in the shape of a figure U having its sides extending in parallel planes. Securely fastened to the rear end of the said U strip is the meter magnet M. Pivotally fastened between the side plates 12 and 13 is an armature 14. A recess 15 is cut into the armature 14, so that when the magnet M is energized the end of the core of said magnet may extend into the recess 15 of said armature. Pivotally secured to the armature 14 is a pawl 16, which operates to register one upon the meter counting wheels (which are secured between the plates 12 and 13) every time the magnet M is energized. Pivotally mounted between plates 12 and 13 is a retaining pawl 18 which engages the ratchet wheel 19 fastened to the units counting wheel. Mounted between the plates 20 and 21 (which are secured to side plate 13) is a clock movement which may be of any suitable type or construction. Secured to the shaft 22 which is rotatably mounted between the plates 12 and 13 is a wheel 24 which transmits the motive power to the clock movement. Loosely secured to the shaft 22 is the angle arm 25 to which is fastened the spring 26 which furnishes the motive power to run the said clock movement. Pivotally fastened to the arm 25 is a pawl 28 which engages with the ratchet wheel 27 which is secured to the said shaft 22. Pivotally fastened to the armature 14 is an arm 31 into which is cut a slot 29, there being a stud 30 upon the angle arm 25 which fits into the said slot. It is therefore readily seen that when the armature 14 is attracted by the magnet M, the arm 25 is rotated about the shaft 22 as an axis, against the tension of spring 26. The rotation of the angle arm 25 about the shaft 22 causes the pawl 28 to be rotated past several teeth upon the ratchet wheel 27; therefore as soon as the flux in the magnet M is reduced the pawl 28 engages a tooth in the ratchet wheel and furnishes motive power to the clock movement from the spiral spring 26. A fan shaped arm 32 is loosely mounted upon a stud 42 secured to the side plate 12. In the lower end of said arm two teeth or notches are cut. Mounted upon the opposite end of the said lever is a bushing 33, which operates to separate the springs 36 and 37 (mounted upon plate 12) when forced forward by a pin 38 secured to the pawl 16. An angle arm 39 is loosely mounted upon a stud 40 in the side plate 12, a spring 41 tends to normally rotate it in a counter clockwise direction. When the arm 32 is drawn forward by the pin 38 in pawl 16, the angle arm 39 tends to revolve in the said counter clockwise direction until the end 43 of said arm drops into the notch 35 on arm 32, (as shown in Fig. 5); thus it is readily seen that arm 39 acts as a holding pawl to keep the arm 32 in an advanced position. The back-stop pin 38ᵃ is provided to prevent arm 32 being moved too far. Just before the armature 14 returns to normal position a pin 44 mounted upon pawl 16 engages the angle arm 39 and revolves it in a clockwise direction thus releasing arm 32 and allowing the end 43 of said arm 39 to drop out of notch 35 and into notch 34 of the arm 32. Attached to the plate 21 is a rectangular plate 45. A slot 46 is cut in the plate 45, as shown in Fig. 6. Pivotally secured to armature 14 is an arm 47 in which is secured a pin 48 that works in the slot 46 of the plate 45 as will hereinafter be more fully explained.

The magnet M comprises two windings, one a comparatively high resistance winding and the other a comparatively low resistance winding. Referring to Fig. 1, when a circuit is closed through the low resistance winding of magnet M the armature 14 is drawn toward the core of the said magnet with the hereinbefore described results. The bushing 33 fastened to arm 32 operates to separate the springs 36 and 37 as hereinbefore explained, thus removing the shunt from around the high resistance winding and placing the two coils in series, the magnetic effects of the two windings being in opposition. The flux in the magnet M, is now only strong enough to overcome the preponderance of weight of the armature 14 and thus hold it in its advanced position. The spring 26 now transmits motive power to the clock movement to cause the same to operate. As the clock movement slowly runs down, the armature 14 slowly recedes from the core of the magnet M until finally the retaining arm of pawl 39 releases the arm 32, whereby the springs 36 and 37 replace the shunt around the high resistance winding. The low resistance winding now receives sufficient current to enable it to attract its armature 14, thus causing the meter to again be operated, and again restoring the tension to spring 26 of the clock movement.

It has been found in actual practice that owing to the fact that the high and low resistance windings oppose each other there is an instant of no flux in the core of magnet M, during which time the armature 14 is liable to fly back to normal position before the steady pull due to the two windings has time to act upon the said armature 14 to retain it in its advanced position. It is evident that such operation would result in premature tripping of arm 32. To overcome this undesirable feature the arm 47 is provided and constructed as hereinbefore stated, thus it is readily seen that as soon as the two windings are placed in series and the armature 14 tends to spring forward it is prevented from doing so by the pin 48 engaging the shoulder 50 in the slot 46. Thus the armature is retarded momentarily in its return until the steady pull of magnet M is established; thereafter the pin 48 drops away from the shoulder 50 and slowly passes forward in its slot 46 as the clock movement returns to normal.

For the purpose of supplying current for operating the central office apparatus and for talking purposes there is shown the battery B having its positive terminal grounded. At Q is shown a busy signaling machine and at R a ringing current generator.

Having given a general description of the apparatus, I will now proceed to an explanation of the operation of the same. For the purposes of this explanation it will be assumed that the subscriber at substation A (Fig. 1) desires to call the subscriber at substation A' (Fig. 2). Inasmuch as a great deal of the apparatus shown herein is old and well known in the art, having been fully described in the publications referred to, its operation will be described in a more or less general manner, the details being given only when they have to do with the application of the principles of my invention.

Upon the removal of the receiver at substation A, preparatory to making the call, a circuit is completed over the line conductors 51 and 52 for the line winding 53 of individual line switch C. Current flow in line winding 53 results in the attraction of armature 102, thereby completing a circuit for the pull-in winding 54 and the auxiliary winding 55 in series. By the energization of the pull-in winding the plunger arm 56 and the cut-off armature 101 are attracted, the former through the medium of its plunger forcing the springs 57, 59, 61, and 63 into engagement, respectively, with contacts 58, 60, 62 and 64, and the latter disconnecting the line conductors 51 and 52 from their connections in the line switch C. It will be seen that the operation of the cut-off armature breaks the circuit of line winding 53, but the armature 102 is momentarily held attracted by current flow in the auxiliary winding 55. Upon the complete attraction of the plunger arm 56, the winding 55 is short circuited, thereby providing by means of the well known slow action for a further retention of armature 102 to allow time for establishing a holding circuit for winding 69 which will be described.

By the engagement of springs 57 and 63 with contacts 58 and 64, respectively, the line conductors 51 and 52 are extended to the line relay 66 of the connector H. Upon energizing, line relay 66 completes a circuit for slow acting relay 67 which relay, upon energizing in turn, completes a holding circuit for line switch C which may be traced as follows: ground at G³, contact springs 106, contact 60, spring 59, and holding winding 69 to battery B. The holding winding 69, as before mentioned, retains the plunger arm 56 and cut-off armature 101 in operated position. A branch of the above holding circuit extends from spring 59 by way of conductor 70 to multiple test contacts in the banks of connector switches having access to the line of substation A, whereby a ground potential on these test contacts the said line is made busy to in-coming calls. Another branch serves to energize the polarizing winding of electropolarized relay O, without operating its armature, however. By the engagement of spring 61 with contact 62 the master switch D is operated in the well known manner to move the plungers of the other line switches in the group into position before the terminals of the next idle trunk line.

The foregoing operations have taken place in response to the removal of the receiver at substation A. It will be noticed that the line conductor 52, when extended to the line relay of connector H as described, includes the left hand winding of electropolarized relay O. Since the right hand or polarizing winding is also carrying current at this time and since the two windings oppose each other, the relay O is not effectively energized. The calling subscriber may now operate his calling device in accordance with the first digit of the desired number, whereby the impulse springs 6 and 7 are separated momentarily a number of times, interrupting each time the circuit of line relay 66 of connector H. As a result of these interruptions of its circuit the line relay 66 is deenergized a corresponding number of times, sending at each deënergization, an impulse from ground at G⁶ to the slow acting relay 72 and the vertical magnet 71 in series, side switch wiper 75 being in its first position. The vertical magnet in response to these impulses, steps up the shaft until the wipers 201, 202, and 203 stand opposite the horizontal level in which are located the set of contacts allotted to substation A'. The relay 72, being slow acting, retains its armature during a series of impulses and maintains an energizing circuit for the private magnet 73. At the end of the series of impulses the relay 72 and the private magnet 73 deënergize, the latter controlling the side switch wipers in the usual manner to advance them to their second position.

The calling subscriber at substation A may now operate his calling device in accordance with the second and final digit of the desired number, resulting as before in deënergizations of the line relay 66. At this stage of the operation, however, side switch wiper 75 being in its second position, the line relay 66 sends impulses to the slow acting relay 72 in series with the rotary magnet 103, whereby the wipers are rotated until they arrive at the contacts 205, 206, and 207 allotted to substation A'. During the last series of impulses the private magnet was operated as before through the medium of relay 72, whereby, at the end of the series of impulses, the side switch wipers are advanced to their third position (it being assumed that the line called was idle at the time).

As side switch wiper 76 comes into its third position, a circuit is completed from ground at G⁷, by way of wiper 202, bank contact 206 and conductor 232 to holding winding 79 of line switch C'. Upon energizing, the holding winding 79 operates the cut-off armature 214, whereby the line conductors 300 and 301 are disconnected from their connections in line switch C' and line conductor 300 is connected to normal conductor 231. As side switch wipers 77 and 78 come into their third positions the connection is completed to the called substation. By the engagement of side switch wiper 75 with its third position contact point the circuit of the ringing relay 80 is established. The ringer relay 80 energizes intermittently (due to the interrupter 81) and operates to disconnect the calling line from the called line and bridges the ringing current generator R across the called line to signal the called subscriber. Upon the response of the called subscriber his transmitter is furnished with talking current through the windings of the back bridge relay 82, which relay, upon energizing, closes a circuit through the ring cut-off relay 83. A further result of the operation of the back bridge relay 82 is the transposition of the calling line conductors as regards their connection to line relay 66, whereby the current is reversed in the calling line. The reversal of the current in the calling line necessarily reverses the flow of current through the left hand winding of relay O. The two windings now assist each other and the relay is operatively energized. By the engagement of contact springs 84 the said left hand winding is removed from the line circuit and the relay O is held energized by the right hand winding alone. A further result of the energizing of relay O is the closing of a circuit through the low resistance winding of magnet M. This circuit extends from ground G² through the right hand winding of magnet M, contact springs 37 and 36 and the relay springs 85 to battery B. As hereinbefore explained the magnet M, upon energizing, removes the shunt from around its left hand winding and places the two windings in series, at the same time registering one upon the meter counting wheels and winding the clock movement, which immediately starts to operate. As hereinbefore explained, after a predetermined interval of time the clock movement runs down and replaces the shunt around the left hand winding of magnet M, which again energizes, counts one more upon the meter, and rewinds the clock mechanism as hereinbefore described. It will thus be seen that the meter is caused to register at predetermined intervals of time commencing when the called subscriber answers and continuing until the calling subscriber releases the connection.

The conversation having been completed the calling subscriber by replacing his receiver upon the receiver hook opens the circuit of line relay 66 which, upon deënergizing, opens the circuit of relay 67. The relay 67, upon deënergizing, removes the holding ground from trunk release conductor 86 and closes a circuit through the release magnet 87 of connector switch H. The release magnet 87, upon energizing, restores the switch shaft and side switch wipers to normal position, its own circuit being opened when the switch shaft reaches its lowest position and breaks the contact of spring 88. The removing of ground from trunk release conductor 86 opens the circuit of holding winding 69 of line switch C, thus allowing the line switch C to withdraw its plunger from the bank. Relay O also has its holding circuit broken by the removal of ground from conductor 86 and, upon deënergizing, opens the circuit of magnet M at springs 85. The magnet M upon deënergizing, allows the armature 14 to drop back and removes the bushing 33 on arm 32 from between the contact springs 36 and 37, thus putting the meter in readiness to again be operated as soon as the calling subscriber again makes a call.

If the called line is busy when the calling party calls, the private wiper 88 engages a guarded contact which prevents the side switch from stepping to third position, and thus prevents the connection from being established with the called line, and in addition causes a busy signal to be transmitted back to the calling subscriber in a well known manner. The calling subscriber upon replacing his receiver operates to release the established connection in the same manner as hereinbefore explained.

It will be seen from the foregoing that I have devised a practical and efficient subscriber's meter for registering successful calls, which meter is provided with time mechanism for producing automatically an additional registration at the expiration of a predetermined time limit.

While I have found it convenient, in describing my invention, to show a certain embodiment thereof, I do not wish to be held to the exact construction disclosed herein, for adaptations will no doubt suggest themselves to persons skilled in the art. I desire, therefore, to include and have protected by Letters Patent all forms and modifications of my invention which may come within the scope of the appended claims.

What I claim as my invention is:

1. In a telephone meter service system, a measured service device for assessing toll, said device comprising a meter, electromagnetic means for controlling said meter, and a time mechanism controlled by said means.

2. In a telephone meter service system, a measured service device for assessing toll, said device comprising a meter, electromagnetic means for operating said meter, means for initially operating said first means, and a time mechanism controlled by said last means for operating said first means periodically thereafter.

3. In a telephone meter service system, a call registering device comprising a meter, means for actuating said meter to register a call, and a time mechanism set in motion upon the operation of said meter and adapted to produce an additional actuation of said meter after a predetermined time.

4. In a telephone meter service system, a call registering device comprising a meter, means for actuating said meter to register a call, a time mechanism set in motion upon the operation of said meter, and means controlled by said time mechanism for registering another call on said meter after a predetermined time.

5. In a telephone meter service system, a call registering device comprising a meter, means for actuating said meter to register a call, a time mechanism set in motion upon the operation of said meter, and means controlled by said time mechanism for operating said meter periodically.

6. In a measured service device, the combination with a meter and a time mechanism, of a magnet for operating said meter, a driving device for said time mechanism in which power is stored at each operation of said magnet, and a circuit for said magnet controlled by said time mechanism to operate said meter periodically.

7. In a measured service device, the combination with a meter and a time mechanism, of a magnet for operating said meter having two windings, a circuit through one of said windings for operating said magnet, means effective upon such operation for connecting said windings in series to render said magnet inoperative, a winding device for said time mechanism operated at each operation of said magnet, and means controlled by said time mechanism for cutting out one of said windings to render said magnet operative.

8. In a measured service device, the combination with a meter and a time mechanism, of a magnet for operating said meter having two windings, an armature for said magnet, a spring for said armature, a circuit through one of said windings for operating said armature against said spring, means controlled by said armature when operated for connecting said windings in series whereby said spring is enabled to return said armature, means for locking said series connection, means controlled by said armature upon its return for cutting out one of said windings whereby it may again be operated, and means controlled by said time mechanism whereby said spring is prevented from returning said armature before a predetermined time.

9. In a measured service device, the combination with a meter and a time mechanism, of a magnet for operating said meter having two windings, an armature for said magnet, a spring for said armature, a circuit through one of said windings for operating said armature against said spring, means controlled by said armature when operated for connecting said windings in series whereby said spring is enabled to return said armature, means for locking said series connection, means controlled by said armature upon its return for cutting out one of said windings whereby it may again be operated, and means operated by said spring when returning said armature for driving said time mechanism, whereby the return of said armature is made to occupy a definite time interval.

10. In a measured series device, the combination with a meter and a time mechanism, of a magnet for operating said meter, an armature for said magnet, a spring for said armature, a circuit for said magnet for operating said armature against said spring, a locking device controlled by said armature when operated for rendering said magnet inoperative without opening said circuit whereby said spring is enabled to return said armature, means controlled by said armature upon its return for unlocking said device whereby the said armature may again be operated, and means controlled by said time mechanism whereby said spring is prevented from returning said armature before a predetermined time.

11. In a telephone system, a calling and a called line, means for completing a talking connection between said lines, and a call registering device for the calling line, said device comprising a meter, means for operating said meter upon the completion of said connection, a time mechanism set in motion when the meter is actuated, and means controlled by said mechanism for producing an additional actuation of said meter after a predetermined time.

12. In a telephone system, a calling and a called line, means including a plurality of auto switches for completing a talking connection between said lines, and a call registering device for the calling line, said device comprising a meter, means for actuating said meter upon the completion of said connection, a time mechanism set in motion when the meter is actuated, and means controlled by said mechanism for producing an additional actuation of said meter after a predetermined time.

13. In a telephone system, a calling and a called line, means for completing a talking connection between said lines, and a call registering device for the calling line, said device comprising a meter, means for operating said meter upon the completion of said connection, a time mechanism set in motion when the meter is actuated, and means controlled by said mechanism for actuating said meter periodically until said connection is released.

14. In a telephone system, a calling and a called line, means including a plurality of auto switches for completing a talking connection between said lines, and a call registering device for the calling line, said device comprising a meter, means for actuating said meter upon the completion of said connection, a time mechanism set in motion when the meter is actuated, and means controlled by said mechanism for actuating said meter periodically until said connection is released.

15. In a telephone meter service system, a unitary meter structure comprising a register and a time mechanism, means for initially operating said register to thereby start said time mechanism, and means controlled by the time mechanism for producing additional operations of the register at intervals thereafter.

16. In a telephone meter service system, a unitary meter structure comprising a register and a time mechanism each controlling the operation of the other, means for operating said register at the beginning of a conversation, and means controlled by the time mechanism for producing additional operations of the register at intervals during the continuance of the conversation.

17. In a measured service system, the combination with a subscriber's line, of a meter for said line comprising a combined register and time mechanism each controlling the operation of the other, together with suitable mechanical and electrical connections whereby the register is automatically actuated at the beginning of a conversation and at intervals thereafter until the conversation is terminated.

Signed by me at Chicago, Cook county, State of Illinois, this 16th day of Feb., 1916.

JOHN ERICKSON.